INVENTOR.
RUSSELL H. WHEATLEY
BY
Dike, Thompson & Bronstein
ATTORNEYS

May 9, 1961 R. H. WHEATLEY 2,983,776
FRICTION CHARACTERISTICS IN HIGH-PRECISION APPARATUS
Filed Feb. 9, 1959 6 Sheets-Sheet 3

INVENTOR.
RUSSELL H. WHEATLEY
BY
Dike, Thompson & Bronstein
ATTORNEYS

May 9, 1961  R. H. WHEATLEY  2,983,776
FRICTION CHARACTERISTICS IN HIGH-PRECISION APPARATUS
Filed Feb. 9, 1959  6 Sheets-Sheet 4

INVENTOR.
RUSSELL H. WHEATLEY
BY
Dike, Thompson & Bronstein
ATTORNEYS

May 9, 1961 R. H. WHEATLEY 2,983,776
FRICTION CHARACTERISTICS IN HIGH-PRECISION APPARATUS
Filed Feb. 9, 1959 6 Sheets-Sheet 6

INVENTOR.
RUSSELL H. WHEATLEY
BY Dike, Thompson & Bronstein
ATTORNEYS

2,983,776
FRICTION CHARACTERISTICS IN HIGH-PRECISION APPARATUS

Russell H. Wheatley, 200 Ashland St., Abington, Mass.

Filed Feb. 9, 1959, Ser. No. 792,109

12 Claims. (Cl. 123—146.5)

The present invention relates to improvement of the mechanical response characteristics of movable elements of sensitive equipment, and, in one particular aspect, to novel and improved apparatus for sensitizing the responses and increasing the accuracy of ignition timing control devices for vehicle engine control systems.

As greater precision and swifter responses are demanded of devices having mechanically-moving components, it becomes increasingly difficult and costly to overcome the complications introduced by such fundamental factors as friction and backlash. This is true in apparatus which may comprise primary detectors, or end devices, or intermediate stages of a system, and attempted solutions to such problems have generally proceeded in the routine direction of improvement of bearing surfaces, lubrications, weight reduction, and the like. Limiting conditions are commonly encountered, however, as in those instances where the movable parts sought to be rendered frictionless must be of relatively great strength and bulk and must cooperate with large bearing surfaces having correspondingly large load-carrying capacities, or as in those instances where shock and acceleration forces prohibit use of sensitive low-friction bearings, or where optimum lubrication cannot be maintained.

In the case of ignition timing apparatus for internal combustion engines, these problems and the unsatisfactory character of the attempts at solution of them are especially noteworthy. The modern form of ignition controller, or distributor, not only commutates and occasions needed intense electrical discharges for ignition of compressed fuel-air mixtures in engine cylinders, but also achieves a control of timing of explosions in each cylinder modulated in accordance, first, with engine speed and, second, with level of vacuum in the engine intake. Mechanical linkages, pivots, levers, and ball-bearing mountings are conventionally involved in this control of timing, and all movable elements must be of such rugged and coarse construction, because of the forces they withstand and the severe environment in which they are employed, that they cannot be made delicate, sensitive, and quickly and accurately responsive. Only the most sparing use of lubricants is permissible because of the need for cleanliness of electrical contacts in the same apparatus. Minute control forces which are sought to be applied in control of ignition timing as a desired null condition is approached are smaller than existing friction levels and are thus ineffective to produce the necessary fine and accurate control actions. As a consequence, practice of ignition timing control has remained relatively crude as compared with theoretically optimum control, and it has been necessary to approach improvement of engine performance from the wholly different directions of design changes in the engines themselves and of use of premium fuels.

Through practice of the present teachings, however, difficulties of the aforesaid character are avoided and the operating precisions and speeds of response of movable elements are significantly improved, there being unique sensitizing of these elements as the result of special vibratory effects. It has of course been known earlier that shock and vibration can in some cases be beneficial in "shaking out" friction and overcoming friction peaks in delicate pivots, as is exemplified by the old expedient of tapping electrical instrument cases to insure that their movable armatures will settle without binding in erroneous indicating positions, or as is further exemplified by the technique of simulating the vibrations of rough engines such that delicate instruments on a craft run with smoother engines will behave as though substantial ambient vibration were present. I have found, however, that the mere creation of shock or vibration environments may nevertheless be unsatisfactory in overcoming friction difficulties and, in this connection, note as example that the aforesaid type of automotive engine distributors for ignition timing control will exhibit lack of accuracy and relatively poor response characteristics despite the fact that they are unusually well oriented to receive engine vibration and road shock.

Accordingly, it is one of the objects of the present invention to provide improvement of the effective friction characteristics of movable elements in precision apparatus through effects of vibrational energy exchange between mechanically resonating structures.

Another object is to provide novel and improved devices in which mechanically movable elements are sensitized for accurate and swift responses to low levels of actuating force by directionally-controlled vibration of vibratile supporting structure which interacts with tuned vibrator apparatus.

It is a further object to provide improved precision equipment in which supporting structure for relatively movable elements cooperates with tuned vibrator apparatus to experience resultant vibrations of direction, frequency, and undulating amplitudes which minimize effective frictions.

Yet another object is to provide improved apparatus in which low effective friction between relatively movable parts is achieved by effects of vibrational energy exchanges between mechanically resonating structures at least one of which is excited by ambient shock and vibration forces.

Still further, it is an object to provide improved ignition timing apparatus for vehicle engines in which low-cost mechanisms render part of said apparatus vibratile and occasion unique interactions with critically associated vibrator equipment to heighten the precision of ignition timing control.

By way of a summary account of practice of this invention in one of its aspects, the casing of a distributor assembly for regulation of the ignition timing of an automobile engine in accordance with both engine speed and carburetor venturi vacuum is resiliently mounted upon the supporting engine such that it possesses restrained freedom for movements both angularly and radially in relation to the usual support axis coincident with the rotatable distributor shaft axis. Resilient mounting of the distributor casing is promoted by the provision of a flexible conduit for vacuum advance control, while the conventional flexible ignition wiring advantageously does not interfere with the angular and radial freedom for restrained movements. The distributor casing and those components which are fixed with it, together with the resilient mounting, constitute an important vibratile assembly, which assembly cooperates in a special manner with tuned vibrator equipment carried by the assembly. Preferably, the vibrator equipment includes two separate masses each fixed upon a different flat spring, the spring-mass combinations being mechanically resonant at frequencies near the natural frequencies of the resiliently-mounted vibratile distributor assembly, and the resonant spring-mass combinations further being tuned and mounted to cause heterodyning in the distributor assembly at a low frequency of the order of ½ cycle per second. Characteristic vibrations of the spring-mass combinations and of the vibratile assembly are induced by ambient shock and random engine vibration, in one construction, and the resultant vibrations which are developed due to their interactions possess an amplitude modulation envelope undulating at about a one cycle per second periodicity. The two spring-mass combinations are mounted upon the distributor assembly to apply their energies of vibration in directions which stimulate both angular and radial vibrations of the vibratile distributor assembly. Linkages, pivots, and bearings of the speed and vacuum control mechanisms supported by the vibratile distributor assembly are found to respond and exercise control as though substantially frictionless, under these conditions.

Although the features of this invention which are believed to be novel are set forth in the appended claims, additional details and further objects and advantages may be most readily perceived through reference to the following description taken in connection with the accompanying drawings, wherein:

Figures 1, 2:
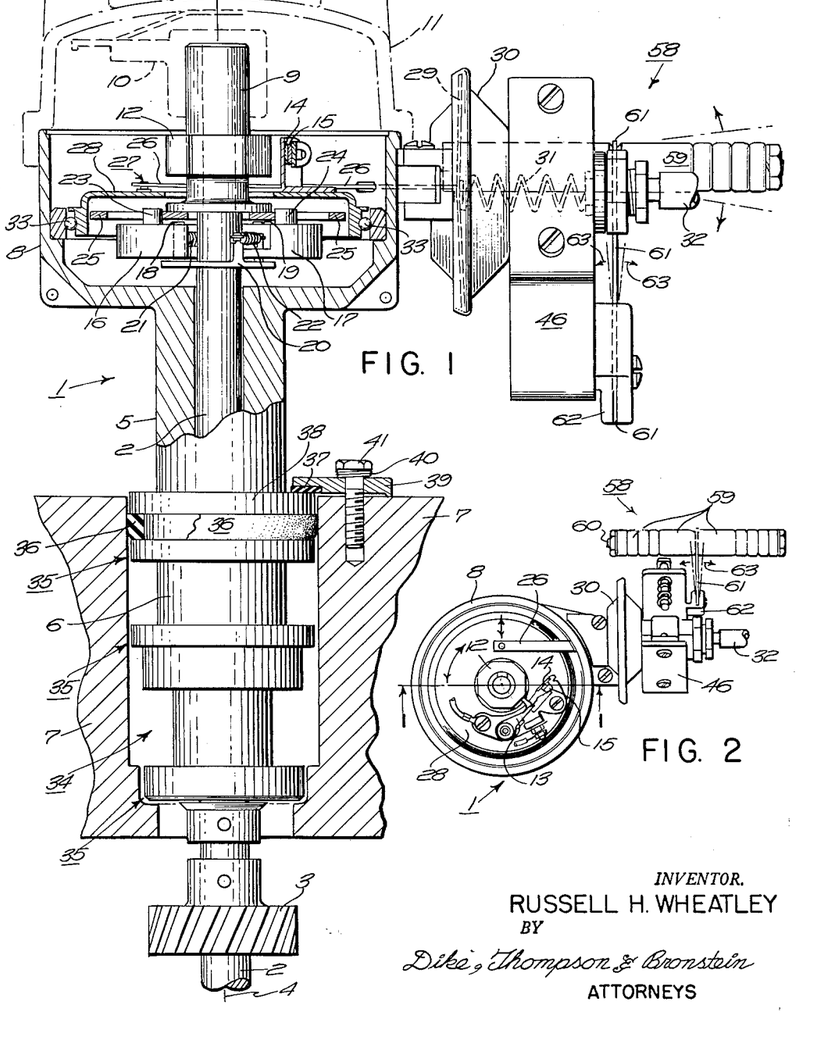
Figure 1 provides a partly cross-sectioned side view of an engine-mounted ignition timing distributor and vibrator assembly in which teachings of this invention are practiced.
Figure 2 is a plan view of the Figure 1 assembly with the cap of the distributor casing removed to expose the interior thereof.

In the embodiment of this invention portrayed in Figure 1, the apparatus which is sensitized is in the form of a distributor 1 for the regulation of ignition timing for an internal combustion engine, the regulation being responsive both to engine speed and to engine intake manifold vacuum. The distributor includes the usual rotor shaft, 2, rotated by a gear 3 turning with an enmeshed engine-driven gear, such as a gear commonly associated with the engine camshaft, not illustrated. Shaft 2 is supported for rotation about an axis 4—4 by a casing 5 which includes a base portion 6 set into part of the engine 7 and an enlarged hollow cylindrical portion 8 accommodating timing control and circuit breaker elements. At its upper end 9, which is angularly movable in relation to the remainder of the rotor shaft 2 under spring restraint of a governor assembly, the rotor shaft carries a rotor arm 10 which commutates high voltage excitation to the engine spark plugs through flexible cables connected to terminals in a cap 11 in a known manner, the cap and rotor arm being illustrated in double-dashed linework. A cam 12 is also fixed with the angularly movable end 9 of the rotor shaft, and its eight lobes cooperate with a movable rider 13 (Figure 2) which closes and opens electrical circuit contact points 14 and 15 having conventional circuit connections needed to occasion high ignition voltages in the electrical system for the engine.

A centrifugal spark advance mechanism which modulates the ignition timing in accordance with engine speed comprises two governor weights, 16 and 17, which are journalled for angular movement upon pivot studs 18 and 19 of a flange 20 fixed with rotor shaft 2. Each of these weights is biased radially inward toward axis 4—4 by a different one of springs 21 and 22 connected between it and the flange 20, but, as the rotor shaft speed increases, centrifugal force urges the governor weights outwardly and develops a camming action between their cam pins 23 and 24 and the cooperatively-slotted cam plate 25 fixed with the relatively movable upper end 9 of the rotor shaft structure. Increasing engine speed thus results in angular displacements of the lobed cam 12 from a predetermined relative orientation in a sense which desirably occasions opening of the contact points 14 and 15 earlier in relation to each engine compression stroke. This ignition advance action is of cardinal significance in achieving good engine efficiencies, and it is highly important that the responses in the centrifugal control mechanism be both immediate and accurate. On the other hand, it is apparent that swift responses and precision operation are opposed by the frictions developed at a plurality of positions including the following: the bearing surfaces between weights 16 and 17 and their pivot studs on flange 20; the bearing surfaces between cam pins 23 and 24 and the cam plate 25; and the bearing surfaces between rotor shaft 2 and its relatively movable upper end 9. While it might be expected that delicate low-friction bearings could alleviate such problems, it must also be recognized that these would be required to withstand intense heat, contaminated atmospheres, and large shock, acceleration, and random vibration forces, such that cost and complexity and difficulties is assembly, adjustment, lubrication and repair would make this approach unattractive.

A further important ignition timing control which is employed in some systems, and which is intended to promote optimum power and fuel economy, is responsive to engine manifold vacuum, the manifold "vacuum" pressure being variable with engine load. For this purpose, the illustrated distributor assembly further includes a movable link arm 26 having a pivotal connection 27 to a breaker plate 28 at one end and having an actuating connection with a movable diaphragm 29 at its other end. Diaphragm 29 is conveniently disposed within a capsule 30 attached to the outside of casing portion 8 and is biased to a predetermined neutral position by a spring 31. Engine manifold pressures are communicated to one side of the diaphragm by a coupling tube 32 connected to a suitable part in the carburetor where the pressures of interest are present, and the differences between these pressures and the atmospheric pressure experienced on the other side of the diaphragm cause diaphragm deflections and wanted movements of the link arm 26. Breaker plate 28 supports the aforementioned cam rider 13 and the contact points, and is itself rendered angularly movable about the rotor shaft axis 4—4 because of its mounting within casing part 8 in a large-diameter bearing which includes the bearing balls 33. When the diaphragm is not deflected from its neutral position, breaker plate 28 should possess a predetermined angular orientation within casing 8, such that the cam rider 13 thereon will interrupt the contacting of the points thereon in a predetermined timed synchronization with the engine combustion processes, subject, of course to the influences of the earlier-described speed governing mechanism. Manifold vacuum acting upon the diaphragm as throttling mechanisms are partly opened causes the link arm 26 to turn breaker plate 28 in a direction opposite to that of rotation of lobed cam 12, whereby the contact points 14 and 15 are opened at earlier times in relation to the engine compression strokes, i.e., the spark is advanced. As the engine throttling mechanism is then suddenly opened wide, engine vacuum decreases and the spring 31 immediately seeks to urge the link arm and breaker plate in direction to retard the spark. The pivoting at 27 and the bearing support by balls 33 involve frictions and locking tendencies which are deleterious in connection with precision and response speed. For reasons already outlined in relation to like difficulties with the centrifugal governing mechanism, the solutions to such problems utilizing known techniques are not attractive.

Figures 3, 4, 5:
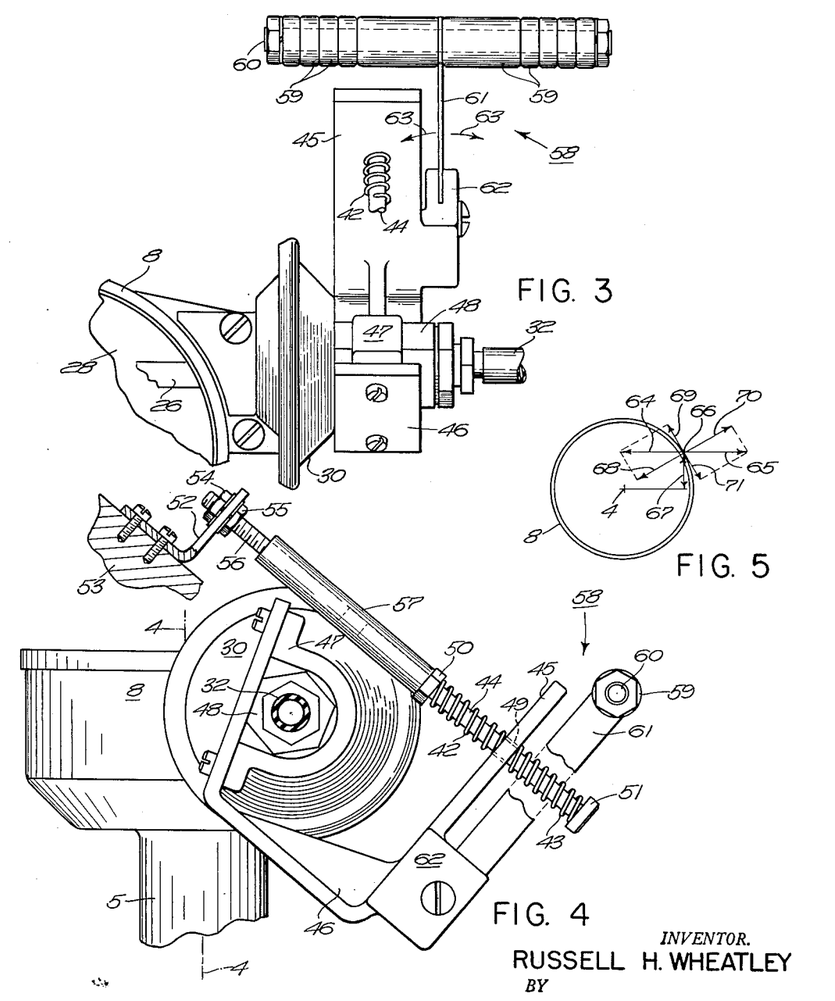
Figure 3 depicts portions of the vibrator mechanism and its mounting upon a distributor casing, the view being in the same direction as that of Figure 2.
Figure 4 illustrates the same vibrator and distributor assembly in a side view which is in a direction transverse to that represented in Figure 1.
Figure 5 is a schematic diagram showing vectorial components of certain vibration forces present in the apparatus of the preceding figures.

Although the site of mounting of a distributor assembly involves a shock and vibration environment, this is not found to reduce the control mechanism difficulties satisfactorily. However, by developing certain directionalized and frequency- and amplitude-regulated resultant vibratory effects, such difficulties can be suppressed to an optimum degree. In the instance of the distributor assembly of Figures 1 through 4, for example, this practice involves, first, the creation of a special vibratile mounting of the distributor casing in its support upon the engine block and, second, the creation of an auxiliary resonant mechanical circuit into and out of which vibratory energy may be passed in selected directions. For the purpose of rendering the distributor casing and affixed parts both vibratile and capable of responding to the applied vibrations from the engine and from the camming assembly driven by the distributor shaft, the casing base 6 is set into the accommodating recess 34 with small clearances 35 facilitating important relative movements, and desired resilient restraint is introduced by an annular compression ring 36 between casing base 6 and inner walls of recess 34 and by a resilient pad 37 intermediate the casing boss 38 and an adjustable engine block clamp 39. Further resilience in the clamping may also be achieved through action of the spring 40 intermediate the clamp and its adjusting bolt 41. Tube 32, which couples the manifold vacuum pressures into the diaphragm capsule 30 is preferably made flexible to prevent unnecessarily rigid restraint of the distributor casing, and a section of rubber tubing or the like proves to be satisfactory. The usual relatively flexible electrical wiring connections do not prohibit needed small-amplitude vibratory movements of the distributor. While the resilient clamping and grommeting of the distributor base 5 in the engine block prevent its becoming dislodged from the recess 34, the tendencies of the casing to turn angularly with the rotating distributor shaft 2 and, thereby, to disturb the timing must be restrained or biased also. The latter restraint must be resilient to facilitate intended casing vibrations, and one convenient arrangement for accomplishing this is depicted in the view of Figure 4 wherein a pair of opposed compressed coil springs 42 and 43 are shown to be held upon an adjusting rod 44 and to bear against opposite sides of a bracket element 45 which is part of a bracket 46 fixed with the distributor casing by way of a clamp 47 conveniently supported upon the rigid connection 48 of the casing-mounted capsule 30. Rod 44 passes through a bracket opening 49 and is slidable in relation to bracket element 45 under restraint of the two springs 42 and 43 which are slightly compressed between the bracket surfaces and rod stops 50 and 51. This restraint may be varied through adjustment of stop 50, which is in the form of a nut threaded upon part of rod 44. The rod 44 is in turn coupled with a clamp 52 which fastens one end to a conveniently located part of engine structure, 53, fixed in relation to the engine block 7. Adjustment of the displacements between this clamp and the bracket element 45 are facilitated by nuts 54 and 55 threaded upon the rod extension 56, and such displacements govern the null angular orientation of the distributor casing about the central axis 4—4. A flexible tubing element 57 constituting part of the adjusting rod assembly enables the rod assembly to accommodate itself readily to different adjustment conditions without binding in the bracket element 45.

With the described resilient restraints, the relatively massive distributor casing assembly is afforded freedoms to vibrate in two principal senses: first, angularly about its biased null angular orientation about axis 4—4; and, second, laterally in relation to the resiliently biased mid position of axis 4—4. Such vibrational movements are movements of the casing assembly in relation to its fixed support, the engine block, although the relatively fixed support itself will receive shock and vibration as the engine and a vehicle powered by it are operated. In developing needed resultant vibrations in the two senses mentioned, an auxiliary directionalized and tuned mechanical vibrator assembly 58 is employed. This assembly conveniently includes a mass formed by a plurality of weights 59 secured together upon a bolt 60 and mounted near one end of a flat elongated spring member 61, the latter being secured at its opposite end to a bracket element 62 which is part of the aforementioned bracket 46. Depending upon such factors as the mass of weights 59, the spring constant of member 61, and the length of spring member 61 intermediate the position of its mounting on bracket element 62 and the position at which weights 59 are secured, the mechanical vibrator assembly will have a predetermined natural resonant frequency of vibration in directions transverse to the plane of the flat spring member. Stiffness of member 61 across its width prevents appreciable vibration other than in the said directions, which are represented by arrows 63 in Figures 1, 2 and 3.

The mounting of the vibrator assembly in relation to the distributor casing is such that the forces transmitted between the vibrator and casing, through the bracket 46 and vacuum advance structure on which the bracket is mounted, have components in both radial and tangential directions relative to the cylindrical casing part 8. Referring to the diagram of Figure 5 in this connection, and considering the forces applied to casing 8 by vibrator 58 after it has been impulsed to resonate under influence of ambient shock and random vibration, it is noted that these forces, 64 and 65, occur at casing position 66 alternately and in opposite directions. These forces are displaced from radial alignment with axis 4—4 by a distance 67, and each therefore includes two vectorial components one of which is in the said tangential direction and the other in the radial direction. The radial and tangential components of force 64 are numbered 68 and 69, respectively, and are numbered 70 and 71, respectively, in connection with force 65. Tangential components 69 and 71 arise alternately and tend to induce angular vibration of the casing assembly in its resiliently restrained mounting. Radial components 68 and 70 likewise arise alternately and tend to induce lateral vibration of the casing assembly in relation to the illustrated resiliently restrained neutral orientation of axis 4—4.

Vibrator 58 is preferably disposed to be excited into resonant vibration by ambient shock and random vibration forces in a highly efficient manner. In automobile engine applications, the weights are preferably oriented to respond well to slight engine rocking motions, and an unbalance of weights about the supporting spring member tends to promote responses to substantially vertical road-shock forces in those instances where the spring member is itself substantially vertical. Vibrator excitation is also derived from the distributor assembly on which it is mounted, it being apparent that the mounting of this assembly renders it vibratile and highly responsive to the environmental shock and vibration. Because of this there is energy exchange between the distributor casing and the associated vibrator, the vibrator functioning to receive excitation from the casing and to perform a selective amplification and to return directionalized vibrational energy of predetermined frequency to the casing. The total mass of the weights 59, and the length and spring constant of member 61, are selected to yield a natural resonant frequency which closely matches a frequency at which the vibratile distributor casing can be stimulated to vibrate readily in the aforementioned radial and angular directions. Responses of the casing assembly are high when the vibrator natural frequency is near the natural frequencies, or harmonics thereof, of the distributor casing assembly in these directions. An apparatus such as that of Figures 1 through 4, representing the ignition timing distributor for an eight-cylinder V-type gasoline automobile engine, is found to have an optimum natural vibrator frequency of about 8½ cycles per second. Insofar as vibrator energy is concerned, the amplitude of vibrator movements is preferably made sufficiently large, the spring member sufficiently stiff, and the weights sufficiently massive, so that the force components 69, 71, 68 and 70 are large enough to induce resultant vibrations of the relatively massive casing assembly in the intended directions and with sufficient amplitude to sensitize the movable control elements of the distributor. In accordance with these objectives and principles, the vibrator may readily be designed to satisfy the requirements of particular applications. For example, the radial and angular vibrations for the Figure 1 apparatus preferably should be ample enough to develop resultant slight relative displacements at the sites of pivot position 27, bearing balls 33, pivot studs 18 and 19, and the cooperating surfaces of cam pins 23 and 24 and cam plate 25. If insufficient resultant vibration develops at these sites, the total mass of vibrator weights may be increased and that spring constant and/or length of the spring member altered in a known compensating manner to preserve the desired natural frequency while developing the wanted larger vibratory forces.

Frequency of the resonant vibrator forces is preferably high in relation to expected periodicity of control movements of the control members. Considering the example of the breaker plate 28, it is known that relative angular movements between it and the distributor casing at a repetition frequency of about 8½ cycles per second are fast, and the period is thus short, in relation to the times required for controlled angular movements of this plate by the vacuum advance link arm 26. The relative angular movements are also small enough at the frequency of resultant vibration involved so that the intended vibration does not introduce control errors. Instead, the intended resultant vibration results in average relative positions of the control members and casing which are those needed to insure accurate timing control. Amplitude and energy of these intended vibrations suffices to overcome such frictions as are normally present and which tend to prevent control movements responsive to smaller control forces. Significantly, troublesome backlash effects are overcome because the relatively movable members assume average relative positions which are accurate for the intended control purposes.

Particularly beneficial effects are secured because of the unique resultant vibrations which are created by interactions between the vibrator unit and the vibratile casing structure, and it is for this reason that such resultant vibrations are stimulated intentionally. The Figure 6 diagram characterizes the type of vibratory effects which can be promoted, the natural frequency to which the vibrator is tuned being represented by the substantially sinusoidal component wave 72, and the natural frequency to which the vibratile casing assembly is tuned being represented by the substantially sinusoidal component wave 73. When these two waves are of slightly different frequencies, as shown, the effects of their interactions yield a resultant, 74, which is amplitude modulated and undulates at a frequency corresponding to their difference frequency. It is not necessary that the resultant 74 be a pure sinusoid of but one frequency. But it is advantageous that it undergoes rapid alternations which are of high frequency, and that these alternations themselves vary periodically in maximum amplitudes. Dashed-line wave envelope 75 of resultant 74 characterizes such a periodicity, the resultant being essentially zero under time-displaced nodal conditions identified on the time scale by reference characters 76 and 77, and rising to maximum amplitude under anti-nodal conditions at intermediate times such as time 78. The waveform of envelope 75 is repetitive, of course, only a half cycle of variations being depicted in Figure 6. In the example of the earlier-described distributor assembly, a resultant vibration having a modulation in peak amplitudes at a frequency of about ½ cycle per second is found to produce useful results. With a vibrator tuned to have mechanical resonance at about 8½ cycles per second, the corresponding tuning of a vibratile distributor casing structure which stimulates this resultant is calculated to have an effective detuning by about ½ cycle per second. Although for purposes of illustration the amplitudes of component vibration waves 72 and 73 have been represented as having equal amplitudes, and the resultant 74 thus has nodes of zero amplitude, it is to be expected that the component wave amplitudes will be different in many applications. The resultant wave curve then approaches minimum, but not zero, amplitudes while undergoing periodic nodal conditions, and this phenomenon can produce advantageous effects. It is found that certain useful beat effects can also be developed with the vibratile assembly and associated vibrator unit tuned to the same frequency. This action is believed to result principally from the phase shifts in the component waves induced by ambient shock and random vibration in the environment in which the casing assembly and vibrator unit are located. For example, the vibrator unit mounted on an automobile distributor casing will tend to become repeatedly shock excited responsive to irregular road shocks and engine vibrations, and its responses to such shocks and vibrations will tend to be at least temporarily somewhat different from those of the distributor casing, whereby different and shifting phase relationships of the casing and vibrator tend to produce the desired resultant effects including nodes and anti-nodes.

The variations in amplitude of resultant vibration which are developed by these interactions between the vibratile assembly and vibrator are deemed important for several purposes. First, the vibratile assembly which experiences the resultant forces will be vibrated not at merely a single amplitude but at amplitudes within a range of different amplitudes during each half cycle of the beating. Inasmuch as each different relatively movable element supported upon the vibratile assembly is likely to be best sensitized for immunity to friction and backlash problems when the relative vibration between it and the supporting assembly is of a different optimum amplitude, each of a number of such different elements will nevertheless be well sensitized as the varying vibration amplitude passes through its optimum value. Second, where one particular amplitude is of interest, it is unnecessary to resort to complex relative proportioning of the vibratile and vibrator structures to produce this particular vibration amplitude, because it can more readily be created periodically as the amplitudes of the resultant wave are modulated over a range of amplitudes. Third, the periodic nodal conditions involve either no or very low amplitudes of vibration. When these nodal conditions occur, the sensitized control elements dwell momentarily in relation to their supporting assembly, without there being any substantial agitation such as may occur under anti-nodal conditions. During dwell periods, the relative orientations between the supporting and relatively movable supported members tend to be accurate. Between such periods, the relatively movable member to which the resultant vibration is applied is more vigorously vibrated and the likelihood of frictional locking with the other member is overcome. While excessively large relative vibrations can introduce errors, the occurrence of the periodic dwells, each during a significant percentage of each beat cycle, results in high accuracies at such times.

Figure 6:
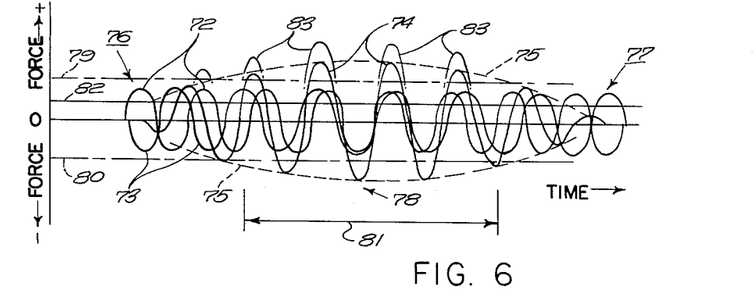
Figure 6 displays characteristic wave forms of certain vibrations appearing in apparatus such as that of the preceding figures.

The positive and negative forces represented in Figure 6 are those exerted in the two opposite directions along a path of restrained movement, such as the forces in different angular directions about axis 4—4 of the distributor of Figures 1 through 4. Resultant forces 74 seek to overcome frictional forces, 79 and 80, which are present in the two directions and which oppose relative angular movements between the distributor casing and a supported control member such as bearing-mounted breaker plate 28. Where friction levels 79 and 80 represent friction peak levels for the bearing balls 33, for example, it will be noted that the resultant forces exceed the frictions and cause relative motion to develop only during the anti-nodal period 81. When a control force 82 lower than the opposing direction is applied in one direction to attempt to cause relative movement in one direction for precision control purposes, it adds with the resultant 74 to produce peaks of forces 83 larger than the opposing frictional forces and developing a net directionality of relative movement needed for the desired control. In this manner, even minute control forces are rendered effective to accomplish a fine control which would otherwise be unattainable in devices having relatively high levels of friction.

Figure 7:
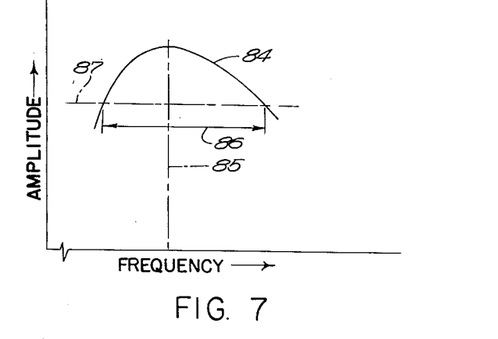
Figure 7 graphically represents variations in vibration amplitudes of a vibratile member associated with a co-operating vibrator as the natural frequency of the latter is altered from a prescribed value.

The relative tunings of vibrator and cooperating vibratile structure which produce optimum sensitizing effects fall within a relatively narrow range. With a vibrator unit corresponding to unit 58 associated with a vibratile distributor casing such as that of distributor 1, and under conditions of resilient restraint of the casing which caused it to have a natural frequency of about 7 cycles per second, a vibrator unit tuning to about 8 cycles per second occasioned highly satisfactory performance and developed desirably large amplitudes of casing vibration and distinct contrasts between the nodal and anti-nodal conditions of vibration. Detuning of the vibrator unit, to somewhat higher and lower natural frequencies resulted in lessened amplitudes of casing vibration and lessened contrast between the nodal and anti-nodal conditions. Characterizing these effects graphically in Figure 7, it is observed from the generalized curve 84 that when the aforesaid vibrator tuning is at an optimum frequency 85 the resulting casing vibration amplitude is a maximum. Deviations from this particular frequency within a limited frequency range 86 causes the casing vibration amplitude to fall above a preferred minimum level 87, with sensitizing and control performance effects deteriorating as the detuning proceeded beyond this range. The preferred range 86 of vibrator unit tuning for this form of apparatus was found to be within about a 2.5% frequency spread on either side of the frequency level 85.

Figure 8:
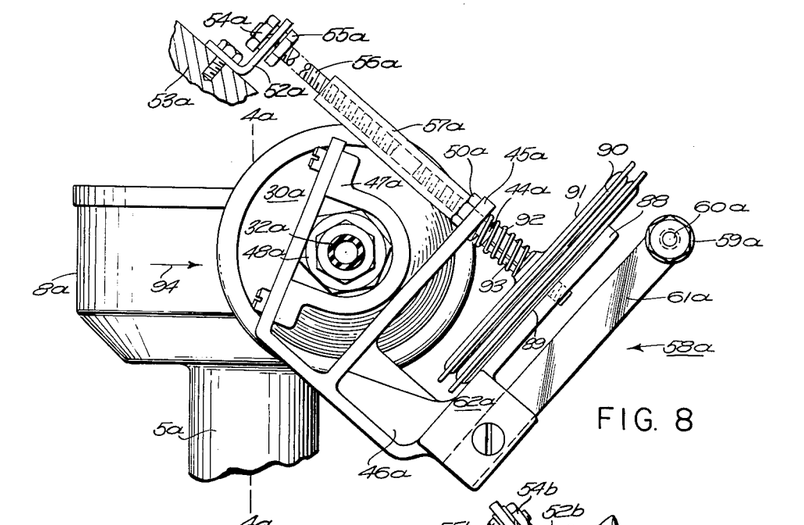
Figure 8 is a side view of part of another ignition timing assembly constructed in accordance with this invention and including provisions for thermal control of ignition timing with improved sensitivity.

In the Figure 8 embodiment of a sensitized distributor apparatus, there is also introduced an improved thermal control of ignition timing, this being preferably exercised in conjunction with centrifugal spark advance and engine vacuum controls of the type already described. For convenience, the elements of this distributor apparatus which correspond to those of the equipment of Figures 1 through 4 are designated by the same reference characters accompanied by a distinguishing letter, a. It will be perceived that this apparatus is arranged to accomplish vibration of the distributor casing and its attached parts, preferably involving the aforementioned nodal and anti-nodal conditions, responsive to interaction of the resiliently-restrained casing with the cooperating vibrator unit 58a. However, bracket 46a in the Figure 8 arrangement further includes an integral bracket element 88 to which one side 89 of an expansible and contractile sealed thermal wafer 90 is attached. This wafer, which is in the form of a bellows filled with a thermally-responsive medium such as ether, is expanded and contracted with increasing and decreasing temperatures, respectively, and its relatively movable opposite side 91 is fastened to the free end of the stationary adjusting rod 44a about which the bracket element 45a is slidable. Spring 92 exerts pressure between bracket element 45a and wafer side 91 to improve the motion characteristics of the wafer, and stop nut 50a and a stop sleeve 93 serve to limit the expansion and contraction of the wafer to within desired limits.

Due to its interposition between fixed adjusting rod 44a and the relatively movable bracket 46a and distributor casing 8a, the resilient wafer 90 provides the needed resilient angular restraint for the distributor assembly. Such resilient restraint enables the angular vibrations required for sensitizing in a manner already described. Increasing temperatures sensed by wafer 90 cause it to expand and thrust its side 89 against bracket element 88, whereby the bracket 46a urges the distributor casing in the direction of arrow 94 about the central axis 4a—4a and retards the ignition timing. Decreasing temperatures produce opposite effects and advance the timing to extents which are needed to improve the engine combustion processes. The resultant vibrations induced by interactions of the vibrator unit and resiliently restrained casing assembly in this instance also develop agitations of the thermal control mechanism and heighten its capability of performing accurate timing control.

Figure 9:
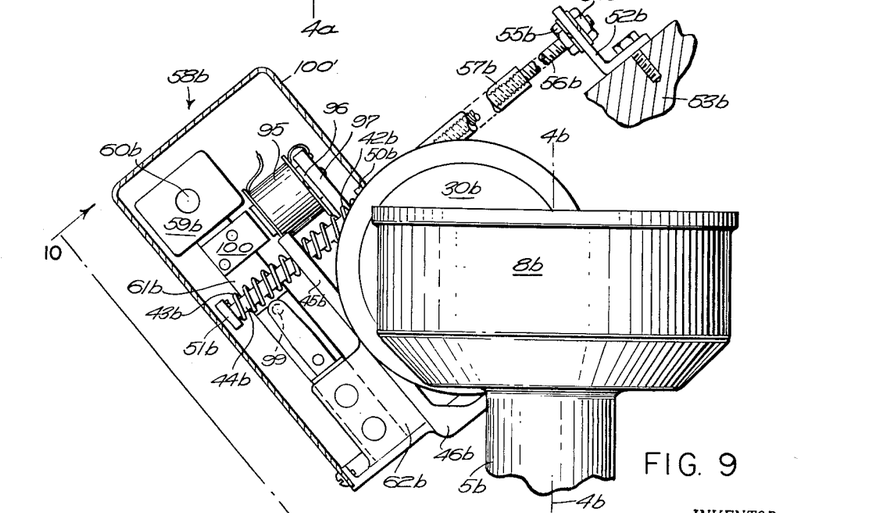
Figure 9 illustrates portions of a further embodiment of this invention practiced with a distributor assembly interacting with an electromagnetically-actuated vibrator.
Figure 10:
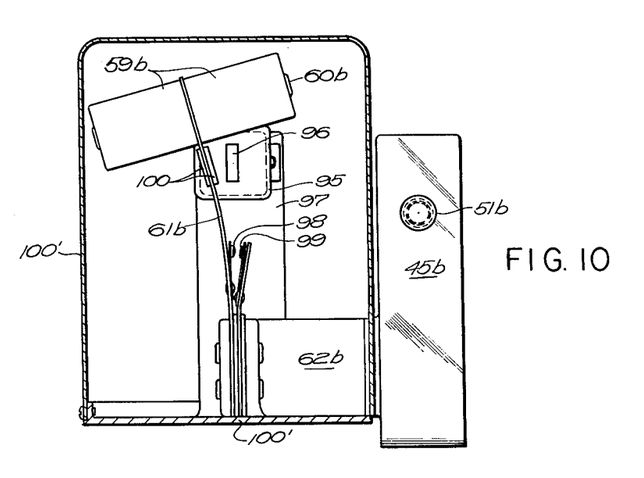
Figure 10 provides a partly cut-away view of the enclosed vibrator mechanism of Figure 9 taken in the direction 10—10 shown in Figure 9.

The further embodiment portrayed in Figures 9 and 10 is representative of those which need not rely upon an ambient shock or random vibrational environment to occasion the desired vibrational effects. In this embodiment, which is also conveniently expressed in connection with an ignition timing distributor apparatus which is in certain respects comparable to that illustrated in Figures 1 through 4, the corresponding elements are designated by the same reference characters, to which the distinguishing letter b is appended. Electromagnetic actuation of the vibrator unit 58b provides exciting forces which impulse the weight and spring combination into resonant vibration and which, in turn, occasion the resulting sensitizing effects described earlier herein. An electromagnetic winding 95 is mounted about a magnetic core 96, for these purposes, the core being supported upon a bracket element 97 and the winding being intermittently energized by a unidirectional voltage source through insulated series switching contacts 98 and 99 in a know manner. Magnetic armature 100 affixed to leaf spring 61b is attracted to the winding core 96 whenever there is engagement between the spring-mounted contact 98 and the insulated resiliently-mounted contact 99. With these contacts oriented to be in engagement when the vibrator is inactive, and with the armature and winding core disposed to be somewhat displaced at such times, the application of electrical excitation results in attraction of the armature toward the core and causes separation of the contacts. The inertia of moved weights 59b results in travel of the spring and weights to a further displaced position, such as that shown in Figure 10, from which the spring forces cause a return to a position at which the contacts are again engaged, and the cycle repeats itself at a frequency depending upon the characteristics of the spring and weights. The tuning of this form of vibration is preferably selected to produce the optimum resultants of vibration which have been described. Electromagnetic actuation is advantageous in a preparatory sensitizing of controls before engine operation commences, and it may also function to amplify or promote more uniform sensitizing characteristics where the environment also contains shock or vibration forces which tend to activate the vibrator. A surrounding enclosure 100′, formed in part by an enlargement of bracket 46a, shields the electromagnetic actuating mechanism against contaminants.

Figure 11:
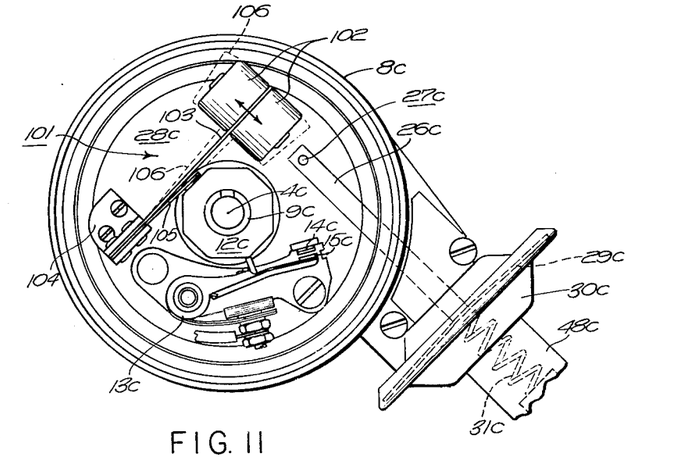
Figure 11 is a plan view of part of a distributor and cooperating vibrator assembly, with the distributor cap removed, wherein mechanical impulsing of the vibrator is derived from the rotating distributor shaft structure.

In those instances where it is sought to sensitize principally one control assembly among several, advantageous results may be secured by insuring that this assembly is itself vibratile and by creating the desired interactions with a vibrator unit uniquely associated with it. Such a construction is depicted in Figure 11, the distributor apparatus there being generally like that of the apparatus of Figures 1 through 4 and having corresponding elements identified by the same reference characters distinguished by addition of the letter c. The distributor casing portion 8c is there rigidly mounted with the engine which it serves, rather than having a resilient mounting in relation to it. Sensitizing actions are induced within the relatively movable breaker plate 28c which is angularly adjustable about the central axis 4c in its ball bearings responsive to actuations of link arm 26c by diaphragm 29c. The flexible diaphragm 29c of the vacuum advance unit 30c is itself resilient, and its associated biasing spring 31c is likewise resilient, whereby the breaker plate structure is rendered vibratile in directions of its restrained angular freedom. Auxiliary vibrator unit 101, including weights 102 fixed to an end of flat spring 103, is mounted within casing 8c upon the breaker plate 28c by way of a bracket 104 secured both to the plate and to an end of spring 103. Vibration of unit 101 is not dependent solely upon the ambient shock and vibration environment but is, instead, conveniently excited by the relative rotary motion of lobed cam 12c on the upper end 9c of the distributor shaft. The latter excitation is derived through a flat spring member 105 which is fastened to bracket 104 and which is biased to ride upon cam 12c. Impulse forces in spring member 105 as it is deflected by the cam are transmitted to the vibrator unit and tend to cause it to resonate actively at its characteristic natural frequency. Dashed linework 106 represents the limits of the vibrator movements, and such movements are effective to induce desired vibration of the supporting breaker plate in angular directions about axis 4c. Resultant vibration at sufficiently high frequency for sensitizing purposes then satisfactorily overcomes disadvantages of frictions in the breaker plate bearings and link arm pivoting 27c, as well as backlash present in the link arm coupling.

Figures 12, 15:
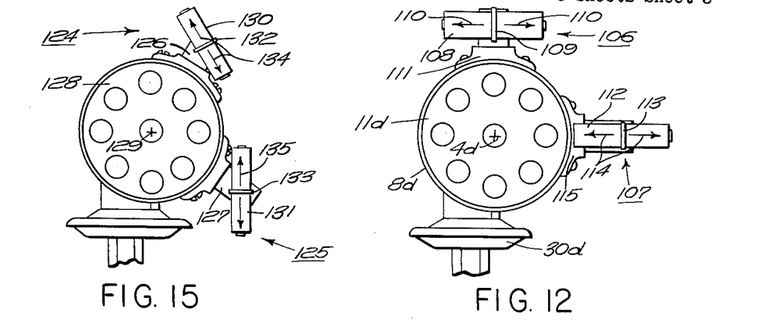
Figure 12 provides a plan view of a sensitized distributor apparatus including a pair of directionalized vibrators each developing sensitizing forces in a different principal direction.
Figure 15 provides a plan view of a sensitized distributor apparatus including a pair of directionalized vibrators each developing sensitizing forces having components in like principal directions and acting to promote important nodal effects.

As is illustrated in Figure 12, an apparatus which is benefitted by the improved vibration effects in more than one principal direction may advantageously employ more than one associated vibrator unit. This is particularly attractive when the natural frequencies of the sensitized vibratile assembly are distinctly different in the different directions. Where distributor casing 8d is resiliently restrained both in the angular directions about its central axis 4d and in directions laterally of this axis, and where the natural frequencies of vibration of the distributor are not alike in these different directions, the two separate vibrator units 106 and 107 function to develop the needed effects. For example, the weights 108 on spring 109 of vibrator unit 106 vibrate in opposite tangential directions 110 and tend to set up angular vibrations of the casing 8d through bracket 111 at a frequency close to that of the vibratile casing in the angular directions. Similarly, weights 112 on spring 113 of vibrator unit 107 vibrate in opposite radial directions 114 and tend to set up lateral vibrations through bracket 115 more closely matched in frequency to the natural frequency of the casing in these directions.

Sensitizing is most dramatically improved, and versatility increased, in further forms of constructions wherein more than a single resonating vibrator unit is employed and where heterodyning occurs between them. In such constructions, the member which is to experience resultant vibration effects is also resiliently restrained so that it may vibrate in intended directions and may thus develop small high frequency displacements in relation to the relatively movable elements which it supports and which it is sought to maintain in precision orientation with it. However, absolute values of the natural frequencies of this vibratile member in its directions of restrained freedom are not of particular importance in these constructions. Instead, the associated plural vibrator units are relied upon the develop needed high frequency vibrations and to generate resultant vibration signals having rapidly recurrent nodal and anti-nodal conditions of the type and advantages earlier described. Conveniently, the vibrator units are two in number, and are each mounted on the sensitized vibratile member in a manner which permits them to transmit their vibrational energies through that member. Two such units tuned to slightly different freqencies produce highly desirable heterodyning effects which are of distinct value in improving sensitivities of relatively movable structures, although a pair of units tuned to about the same frequency may also be similarly used when certain variable phase displacements are developed and promote beating effects between them.

Figure 13:
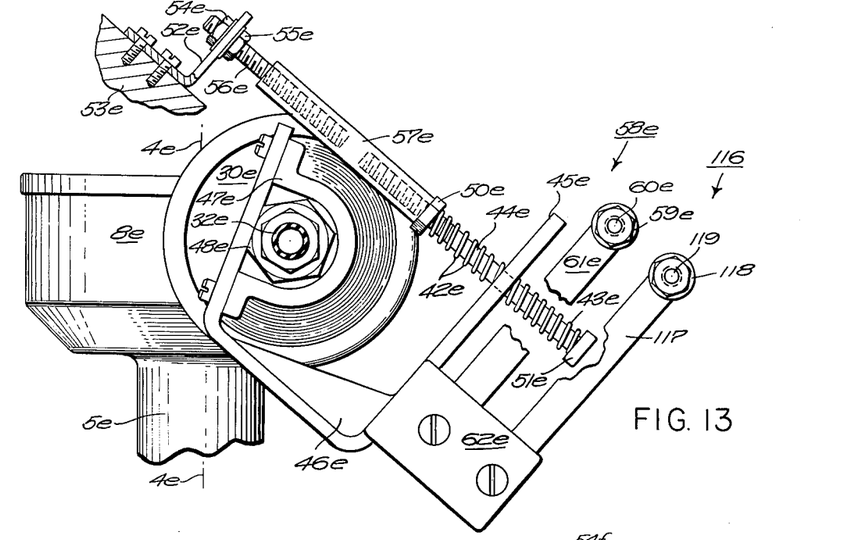
Figure 13 depicts a side view of part of a distributor and interacting vibrator assembly which employs a pair of vibrator units serving to heighten important nodal effects.

The Figure 13 embodiment of these constructional features is of distributor apparatus such as is portrayed in Figure 4, and, for convenience, the same reference characters to which the letter e is appended are employed to designate corresponding parts. Structurally, a significant difference is found in the addition of a second vibrator unit, 116, which is generally like vibrator unit 58e in that it includes a flat spring member 117 mounted at one end upon bracket element 62e and carries weights 118 upon a bolt 119 fastened transversely to the spring member near an opposite end. Vibrator units 58e and 116 both tend to become excited into conditions of vibration, in substantially parallel planes, by exposure to the ambient shock and random vibration environment. By suitable proportioning, their natural resonant frequencies are preferably caused to lie in the vicinity of a relatively high frequency needed for sensitizing, such as the frequency of about 8 cycles per second which is found to be useful in creating adequate vibration of the distributor casing 8e and which is found to be high enough to prevent potentially troublesome interference with ignition timing control actions. In the latter connection, it will of course be appreciated that if the relative control movements sought to be sensitized are themselves expected to fluctuate and to result in control actions at a certain periodicity, it could be disadvantageous to introduce relative vibrations at about this periodicity inasmuch as it would be evidenced in errors. Accordingly, the sensitizing vibrations should occur at relatively higher frequencies the individual amplitude excursions of which will not be followed by whatever elements respond to the relative orientations of the sensitized relatively movable parts.

One of the vibrator units, such as unit 58e, is preferably tuned to a frequency which is appropriate for the foregoing reasons, and the other unit, 116, is tuned to a slightly different frequency either above or below the selected value such that heterodyning can occur at a suitable repetition rate. Natural frequencies of 8 and 7 cycles per second for the two units occasion a satisfactory resultant vibration signal having nodes every half second, for example. These nodes can occasion useful periodic dwell between the sensitized relatively movable parts, as has already been explained, and the repetition rate of the nodes and dwells should be fast enough in relation to the response capabilities of the elements responding to the relative orientations of the sensitized relatively movable parts so that the average relative orientations are controlling. Inertia and restraints of the distributor casing assembly are relatively large about its paths of restrained freedom for movements, and the vibrator units are thus mounted in relation to a relatively fixed base, as is desirable for purposes of their vigorous vibration. Each vibrator unit transmits energy to and receives energy from the vibratile casing assembly on which it is mounted, and it appears that there are complex interactions between each vibrator unit and the vibratile casing assembly and between the two vibrator units. The net result is energetic relative vibration between the sensitized relatively movable parts, however, with desired nodes and antinodes present. Vibrator units 58e and 116 may also be tuned to substantially the same frequency, whereby each can interact with the vibratile assembly on which they are mounted and can also develop heterodyning effects as they respond differently to applied shock and random vibration forces. The two vibrator units need not develop the same vibrational energies, and suitable proportionings of their masses and spring characteristics provide a means for regulating the amplitudes of the resultant vibrations.

Figure 14:
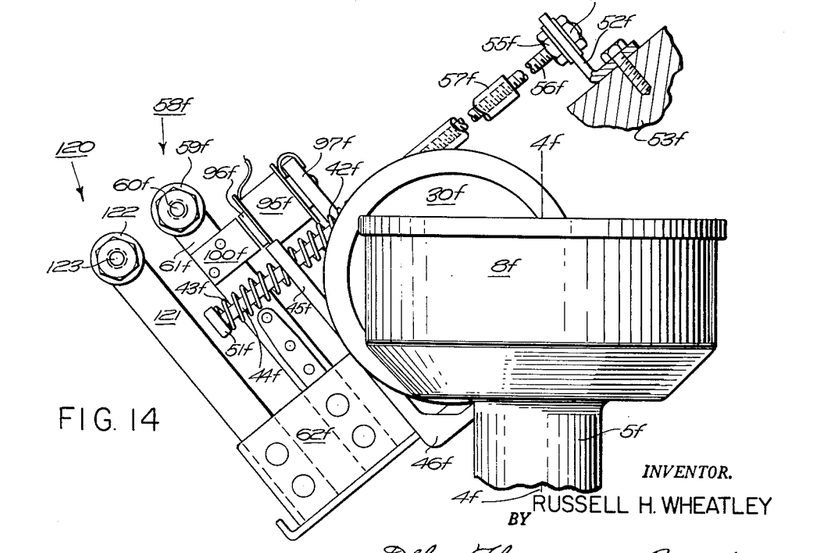
Figure 14 is a side view of an improved assembly such as that of Figure 13 having an auxiliary electromagnetic drive for impulsing one of a pair of tuned vibrator units.

A somewhat similar embodiment appearing in Figure 14 further includes an electromagnetic actuator for one of the vibrator units. This construction is along the lines of that illustrated in Figure 9, although an additional resonant vibrator unit 120 is employed to promote effects such as those described in connection with the embodiment of Figure 13. As an aid to description, the same reference characters applied to elements of the Figure 9 apparatus are employed to designate corresponding elements of the Figure 14 apparatus, except that the letter f has been added to each number or substituted for another letter in appropriate instances to distinguish the elements. The electromagnetically actuated vibrator 58f, which is resonated in a manner related earlier herein with reference to vibrator 58b, develops mechanical vibration forces which are transmitted to the vibratile distributor casing assembly through mounting bracket 46f and which are also transmitted to vibrator unit 120. Vibrator unit 120 includes a flat spring member 121 supported at one end upon the bracket element 62f and carrying weights 122 upon a bolt 123 fastened with its opposite end, and vibrations in directions transverse to the plane of spring member 121 are stimulated by the vibration forces transmitted to this unit by the electromagnetic unit 58f as well as by such environmental shock and random vibration forces as may be present. The two vibrator units and vibratile casing assembly cooperate to produce useful resultant vibration effects, and attendant sensitizing of controls, in a manner described in connection with the embodiment of Figure 13.

Two cooperating vibrator units, 124 and 125, are shown in Figure 15 to have separate and displaced mounting brackets 126 and 127, respectively, associated with the vibratile assembly 128 having resiliently restrained freedom for movements angularly and laterally about an axis 129. Assembly 128 is conveniently illustrated as an ignition timing distributor, although it should here be understood that it may assume other forms, as may the representative distributor apparatus of the other figures also. As the weights 130 and 131 are set into vibration upon their resilient supports, in the convenient form of flat spring members 132 and 133, respectively, they deflect in the directions of arrows 134 and 135, respectively, and communicate vibrational energy to and from the vibratile assembly 128 in both the angular and radial directions about axis 129. Where resilient restraint of assembly 128 is also afforded in longitudinal directions along axis 129, the energy transfer is effected in these directions also. One of the vibrators may be electromagnetically excited by a suitable actuator, such as those hereinbefore described, for example, or both may be excited by environmental forces. In this construction, the displaced vibrator units are physically more independent structures and are separately fabricated. The intercouplings between these units is wholly by way of the vibratile assembly 128 on which they are mounted, and it is insured that there will be pronounced interactions of the vibrator units and the cooperating vibratile assembly. Paired vibrator units of the embodiments of Figures 13 and 14 are preferably fabricated as separate units which are versatile in that they may be affixed to one of a variety of vibratile assemblies, and, similarly, vibrator units 124 and 125 may be supplied as pairs having certain tuned relationships which make them particularly useful when mounted upon different forms of vibratile assemblies which are to be sensitized.

Resonant vibrator units may involve masses and springs or other resilient members of many configurations and materials, and these may of course be designed for substitution for the specific forms illustrated. Likewise, it will occur to those skilled in the art that there are devices other than distributor assemblies which may be rendered vibratile and which may be brought into interactions with vibrators in accordance with these teachings to realize improvements in sensitizing. Accordingly, the specific embodiments of the invention herein disclosed are intended to be of a descriptive rather than a limiting nature, and various changes, combinations, substitutions or modifications may be employed in practice of these teachings without departing either in spirit or scope from this invention in its broader aspects.

What I claim as new and desire to secure by Letters Patent of the United States:

1. Precision apparatus comprising an assembly having at least two members mounted for controlled relative movement responsive to control forces, mounting means including resilient means mounting said assembly in relation to a support with resiliently-restrained freedom for vibration at a natural frequency, said assembly including means mounting one of said members for at least minute vibratory movements in relation to the other, said assembly including means coupling vibrational energy from a source of vibration into said assembly, and vibrator means applying vibration to said assembly at a predetermined frequency, whereby said assembly experiences resultant vibration alternately approaching nodes and antinodes of amplitude.

2. Precision apparatus comprising an assembly having at least two members mounted for controlled relative movement responsive to control forces, said assembly including means mounting one of said members for at least minute vibratory movements in relation to the other at a natural frequency, said assembly including means coupling vibrational energy from a source of vibration into said assembly, vibrator means for developing mechanical vibration forces at a frequency detuned from said natural frequency by a small difference frequency, and means mounting said vibrator means on said assembly to develop resultant vibrations on said assembly which are modulated at said difference frequency.

3. Precision apparatus comprising an assembly having at least two members mounted for controlled relative movement responsive to control forces, said assembly including means mounting one of said members for at least minute vibratory movements in relation to the other at a natural frequency, said assembly including means coupling vibrational energy from a source of vibration into said assembly, first vibrator means tuned to develop mechanical vibration forces at a first predetermined frequency, second vibrator means tuned to develop mechanical vibration forces at a second predetermined frequency detuned from said first frequency by a small difference frequency, and means mounting both of said vibrators in vibrational energy exchange relationship with said assembly and with each other, whereby said assembly experiences a resultant of vibrations from said source and vibrators which alternately approaches nodes and antinodes of amplitude and alternately develops vibratory movements and dwell between said members at the periodicity of said difference frequency.

4. Precision apparatus comprising an assembly having at least two members mounted for controlled relative movement responsive to control forces, said assembly including means mounting one of said members for at least minute vibratory movements in relation to the other, resilient means mounting said assembly for resiliently restrained vibratory movements in relation to a support which is exposed to environmental forces of a vibratory character, at least one vibrator for developing mechanical vibration forces at a predetermined frequency, and means mounting said vibrator on said assembly in vibrational energy exchange relationship therewith to receive energy from said environmental forces coupled with said assembly from said support and to apply vibration forces of said predetermined frequency to said assembly, whereby said assembly experiences vibratory movements alternately approaching nodes and antinodes of amplitude.

5. Precision apparatus comprising an assembly having at least two members mounted for controlled relative movement responsive to control forces, said assembly including means mounting one of said members for at least minute vibratory movements in relation to the other, resilient means mounting said assembly for resiliently restrained vibratory movements in relation to a support, electrically-actuated means applying forces of a vibratory character to said assembly, at least one vibrator tuned to develop mechanical vibrational forces at a predetermined frequency, and means mounting said vibrator on said assembly to receive forces of said force applying means and to apply to said assembly vibration forces of said predetermined frequency, whereby said assembly experiences a resultant of vibrations which is modulated in amplitudes and alternately develops vibratory movements and dwell between the relatively movable members.

6. Apparatus for controlling ignition timing of an internal combustion engine comprising an assembly having, engine-operated ignition timing means and having at least two members mounted for controlled relative movements to vary said timing, mounting means including resilient means mounting said assembly in relation to said engine for resiliently-restrained vibratory motions of at least one of said members responsive to forces of a vibratory character developed by said engine, vibrator means for producing mechanical vibration forces at a predetermined frequency, and means mounting said vibrator means on said assembly to superimpose said vibration forces thereof on the forces of vibratory character developed by said engine.

7. Apparatus for controlling ignition timing of an internal combustion engine comprising a casing, engine-operated ignition timing means within said casing having at least one member mounted upon said casing for controlled movements in relation to said casing to vary said timing, mounting means including resilient means mounting said casing in relation to said engine for resiliently-restrained vibratile motions responsive to forces of a vibratory character developed by said engine, said casing being vibratile at a natural frequency, vibrator means producing vibration forces at a predetermined frequency, and means mounting said vibrator means to apply said vibration forces to said casing and to develop resultant relative vibrations between said casing and said member which alternately approach nodes and antinodes of amplitude.

8. Apparatus for controlling ignition timing of an internal combustion engine comprising a casing, engine-operated ignition timing means within said casing having at least one member mounted upon said casing for controlled movements in relation to said casing to vary said timing, means mounting said casing in relation to said engine for resiliently-restrained vibratile motions responsive to forces of a vibratory character developed by said engine, said casing being vibratile at a natural frequency, vibrator means producing vibratory forces at a predetermined frequency detuned from said natural frequency by a small difference frequency, and means mounting said vibrator means upon said casing to vibrate thereon and to exchange vibrational energy with said casing, whereby said casing and member experience resultant relative vibrations which are modulated in peak amplitudes at said difference frequency.

9. Apparatus for controlling ignition timing of an internal combustion engine comprising an assembly having, engine-operated ignition timing means and having at least two members mounted for controlled movements to vary said timing, means mounting said assembly in relation to said engine for resiliently-restrained vibratile motions of at least one of said members responsive to forces of a vibratory character developed by said engine, said assembly being vibratile at a natural frequency, first vibrator means producing vibratory forces at a first frequency, second vibrator means producing vibratory forces at a second frequency detuned from said first frequency by a small difference frequency, and means mounting said first and second vibrator means in vibrational energy exchange relationship with said assembly, whereby said members experience resultant relative vibrations which are modulated in peak amplitudes at said difference frequency.

10. Apparatus for controlling ignition timing of an internal combustion engine comprising a casing, an engine-driven distributor shaft mounted for rotation within said casing about an axis, electrical circuit interrupting means disposed within said casing for actuation by said shaft, relatively movable members mounted on said casing for controlled relative movements angularly and radially about said axis to vary said timing, means mounting said casing in relation to said engine for resiliently-restrained vibratile motions in directions angularly and laterally in relation to said axis responsive to forces of a vibratory character from said engine and the shaft-actuated circuit-interrupting means, said resiliently-restrained casing being vibratile in said directions, a mass, and a flat spring member mounting said mass upon said casing for vibration at a predetermined natural frequency in directions transverse to the plane of said spring member, said spring member being connected with said casing to transmit energy of vibration between said mass and said casing, whereby said casing and member experience resultant relative vibrations which alternately approach nodes and antinodes of amplitude.

11. Apparatus for controlling ignition timing of an internal combustion engine comprising a casing, an engine-driven distributor shaft mounted for rotation within said casing about an axis, electrical circuit interrupting means disposed within said casing for actuation by said shaft, relatively movable members mounted on said casing for controlled relative movements angularly and radially about said axis to vary said timing, means mounting said casing in relation to said engine for resiliently-restrained vibratile motions in directions angularly and laterally in relation to said axis, said casing being vibratile in said directions, a first mass, first resilient means mounting said mass upon said casing for vibration at a first predetermined natural frequency, a second mass, and second resilient means mounting said second mass upon said casing for vibration at a second predetermined natural frequency detuned from said first frequency by a small difference frequency, said first and second resilient means mounting said masses in vibrational energy exchange relationship with said casing, whereby said casing and members experience resultant relative vibrations modulated at said difference frequency.

12. Apparatus for controlling ignition timing of an internal combustion engine as set forth in claim 11 further comprising electromagnetic means actuating one of said masses to vibrate at the predetermined natural frequency thereof.

References Cited in the file of this patent

UNITED STATES PATENTS

| | | |
|---|---|---|
| 1,511,425 | Roucka | Oct. 14, 1924 |
| 1,512,804 | Roucka | Oct. 21, 1924 |
| 2,396,383 | Moore | Mar. 12, 1946 |
| 2,638,788 | Larkin | May 19, 1953 |
| 2,688,055 | Schneider et al. | Aug. 31, 1954 |
| 2,688,953 | Burns | Sept. 14, 1954 |
| 2,746,813 | Massa | May 22, 1956 |
| 2,926,653 | Kraft | Mar. 1, 1960 |